Feb. 14, 1967 H. A. KURTH 3,304,018

WEB TRANSPORT SYSTEM

Filed Sept. 6, 1963 3 Sheets-Sheet 1

INVENTOR.
HAROLD A. KURTH

BY

Robert G. Clay

ATTORNEYS

INVENTOR.
HAROLD A. KURTH

BY

Robert G. Clay

ATTORNEYS

WEB TRANSPORT SYSTEM

Filed Sept. 6, 1963 3 Sheets-Sheet 3

INVENTOR.
HAROLD A. KURTH

BY Robert G. Clay

ATTORNEYS

United States Patent Office 3,304,018
Patented Feb. 14, 1967

3,304,018
WEB TRANSPORT SYSTEM
Harold A. Kurth, Woodland Hills, Calif., assignor to Ampex Corporation, Redwood City, Calif., a corporation of California
Filed Sept. 6, 1963, Ser. No. 307,124
9 Claims. (Cl. 242—55.12)

This invention relates to systems for transporting web material, and more particularly to systems for providing bidirectional, intermittent movement of magnetic tape at various speeds.

Modern day, high speed data processing systems require correspondingly high speed, high performance digital tape transport systems to provide data at sufficiently high transfer rates to assure that the data processing system is not required to operate with low efficiency during transfer intervals. Thus, greater and greater demands are being placed in peripheral input and output equipment in terms of speed and versatility. Whereas in the past a tape transport system that could operate at tape speeds for data transfer of 150 inches per second was considered "high performance," present requirements are for increasingly higher speeds for data transfer, and for even greater speed capability for search and rewind modes. Along with the increased speed requirements have come requirements for extremely close mechanical control of the tape path because of the very high bit densities of data recorded on the tape and the loss or distortion of reproduced signals resulting from minute displacements of the tape from its true path through the reproducing mechanism. While the tape must be moved in either direction at extremely high speeds and in precise paths past the reading and writing assembly, it must also be handled in a gentle manner to avoid breakage, tape stretching, and undue wear on its magnetic oxide-coated surface. Thus, the problems which must be met in complying with all of the tape handling requirements become quite complex, and particularly so in a tape system which is required to operate intermittently, bidirectionally, and at various speeds. The already complex problem is further complicated by the fact that the tape usually must be started or stopped in a very brief time interval and over a very short tape travel distance, in order to limit interrecord gaps and increase system availability.

Most magnetic tape transport systems thus usually employ low inertia tape buffering mechanisms, such as vacuum chambers, which operate in conjunction with reel servo systems and a pair of contra-rotating tape drive capstans. Pinch roller devices are actuated to engage and disengage the tape from either capstan at high speed, in accordance with command signals received from the data processing apparatus. As the tape is rapidly started and stopped at the capstans, the relatively slower acting high inertia reel motor and reel are permitted to come to speed by changes in the loop length within the vacuum chambers. The loop lengths or positions are sensed by appropriate devices which act to control the reel servos.

A different type of digital tape transport utilizes a single drive capstan, in conjunction with associated buffer mechanisms which hold the tape in low tension, non-sliding engagement with the capstan. The tape is started, stopped and driven in either direction at different speeds simply by change of the capstan speed.

Both types of systems must maintain adequate loop control under extreme conditions. Thus, when reversing at high tape speeds, the tape tends to reach high speed in the reversed direction before the reel servos can react, so that it is desirable that the tape loops be kept within certain size ranges to obviate this possibility. Otherwise, it is necessary to increase the length of the storage devices.

A common requirement is that the tape transport be operable at different speeds in order to provide different data transfer rates. With prior art systems, however, separate circuits must be added to the servo systems for each additional speed. Further and complex circuits are required when it is desired to incorporate a high speed search mode and a high speed rewind mode in which the tape loops in the vacuum chambers are retained. The system must maintain uniform tension on the tape and continue to handle it gently at the high speeds used in these modes, so that the additional problems of accurately referencing the servos to a desired speed become much more severe.

It is therefore an object of the present invention to provide an improved digital tape transport.

Another object of the present invention is to provide a tape transport which provides a number of different operating speeds in particularly economical fashion.

Yet another object is to provide a digital tape transport which maintains precise control over the tape under a wide range of speeds and operating modes.

The present invention obviates the foregoing disadvantages and provides maximum control over tape reel drive servo systems and leads to maximum utilization of available storage facilities. The reel servos are referenced to actual tape movement, whatever the speed chosen. The system also offers improved and positive control over tape loop lengths in the buffer mechanism, and maintains optimum lengths for each tape mode.

Briefly, the present invention is based on the fact that optimum control of the tape buffer system can be obtained by providing speed reference signals to control the reel servos from speed and direction sensing means associated with the drive means that drives the tape. Therefore, a particular system embodying the invention utilizes one or more tachometers driven by the tape drive capstan or capstans or otherwise sensitive to the tape speed and direction at the capstan drive means, along with other tachometers sensitive to the tape velocity at the reel and with tape loop position sensors, to provide speed reference and other input signals to control the tape reel drive motors. The reel servos directly follow the speed and direction of the tape drive system by means of the reference signal, at any arbitrarily selected speed, so that positive control is maintained over the tape reel motors at all times regardless of tape speed, direction of travel, or rapid start-stop characteristics. The tape loops in the vacuum chambers are held at selected lengths for each direction of movement and undue strains on the tape are avoided. In a preferred embodiment, in which the system provides a low friction tape path and utilizes a single, bidirectional drive capstan which is itself started and stopped, a single tachometer may be directly coupled to the drive capstan to provide a speed reference signal for both reel servos.

A better understanding of the invention, along with further advantages and features, may be had from the following description, taken in conjunction with the accompanying drawings, in which:

FIG. 1 shows, in block diagram form, the essential elements of a tape transport system embodying the present invention. For the sake of simplicity and ease of understanding, associated elements not essential to an understanding of the invention have been eliminated, but will be easily understood and supplied by one skilled in the art.

For the sake of convenience of description, certain devices described hereafter will be referred to as "tachometers." However, it is to be understood that the term "tachometer" embraces any device which provides an output signal, one of whose characteristics varies in accordance with the speed of rotation of a rotatable object to which the tachometer is connected, and another of whose characteristics varies in accordance with the direction of rotation of the rotatable object. Typically, the amplitude of a direct current (D.C.) output signal of a tachometer varies in proportion to the speed of rotation of an object to which the tachometer is connected, and the polarity of the ouput signal is controlled by the direction of rotation of the object.

Figure 1:
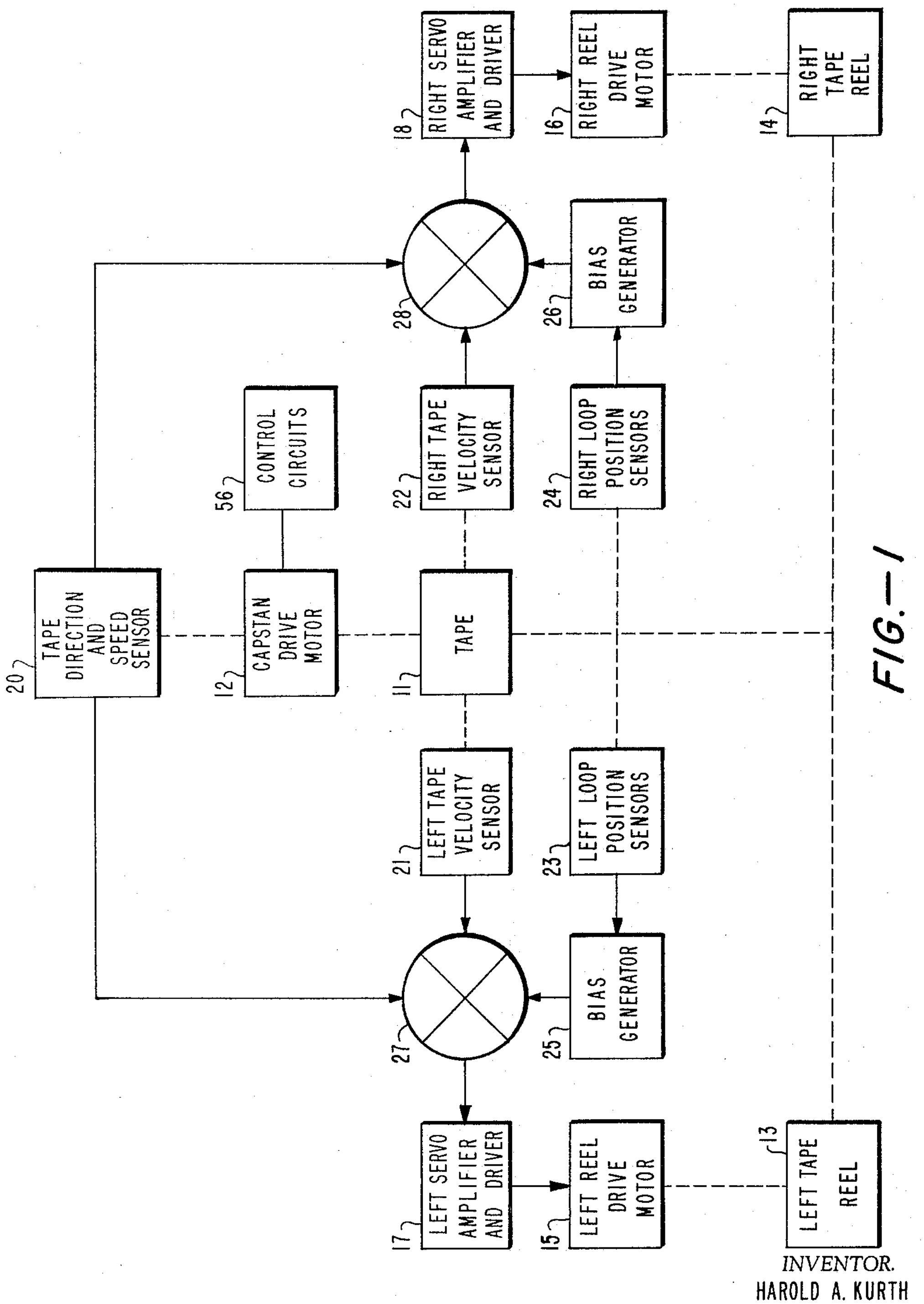
FIG. 1 is a block diagram of a preferred system embodying the invention.

As seen in FIG. 1, a tape 11 is driven by a capstan drive motor 12 between left and right tape reels 13 and 14, respectively. The left and right tape reels 13 and 14 are separately driven by respective left and right reel drive motors 15 and 16, which are respectively energized by output drive signals from left and right combination servo amplifiers and drivers 17 and 18. The left and right servo amplifiers and drivers 17 and 18 receive combined input signals from the left and right tape velocity and position sensors, and from a tape direction and speed sensor 20 driven by the capstan drive motor 12. The left and right tape velocity sensors are designated as 21 and 22, respectively, and the left and right position sensors are designated as 23 and 24, respectively.

The tape velocity sensors 21 and 22 and the loop position sensors 23 and 24 are associated with vacuum chambers or other low inertia compliance means into which the tape is looped (not shown in FIG. 1) to provide low inertia tape buffering mechanisms between the tape reels 13 and 14 and the tape drive capstan. The tape velocity sensors 21 and 22 provide the servo feedback signals whose amplitudes vary in proportion to the speeds of the tape at points adjacent the tape reels and whose polarities indicate the direction of tape travel. The loop position sensors 23 and 24 may comprise vacuum or photosensitive switch mechanisms which are actuated when the tape loops reach specific lengths. The loop position sensors 23, 24 control bias generators 25, 26 which add small but significant D.C. components to the servo input signals.

On both the left and right sides of the mechanism, the negative feedback signals from the tape velocity sensors 21, 22 are algebraically added to the signal from the tape direction and speed sensor 20 as well as the loop length bias signals from the generators 25, 26 in adders 27 and 28, respectively. The sum of these signals is derived as an error signal from the adders 27 and 28 to be supplied to the left and right servo amplifiers and drivers 17 and 18, respectively, to provide the drive signals to the left and right reel drive motors 15 and 16, respectively.

In this system, the signal from the tape direction and speed sensor 20 provides a speed reference signal for the velocity type reel servos 27 and 28. The full speed reference signal is generated immediately upon the tape being brought to speed in a given mode, and the reference signal at all times represents actual tape speed and direction in amplitude and polarity. The major component of the input signal for the reel servos is this speed reference signal supplied by the tape direction and speed sensor 20. This component by itself tends to control the reel motor speed such that tape is taken up or supplied by the reel at a somewhat less rate compared to the rate of tape movement at the capstan. The bias signals, however, provide an additional component which when added to the reference signal causes the tape velocity at the reel to slightly exceed that at the capstan. In this manner, the loop is made to grow or diminish in size until a sensing point is reached. Thus, for a given direction of tape travel, the tape loop lengthens or shortens to a loop sensing point, and thereafter moves back and forth across that point by the action of the alternate application and removal of the bias signal.

By providing signals from the tape direction and speed sensor 20 to both servos in this system, complete control is maintained over the tape under all operating modes. No matter what tape speed or direction is called for during a program, the supply reel and takeup reel are driven so that tape is furnished and withdrawn in such proportions that optimum loop lengths are established and maintained. Specifically, a chamber receiving tape from the capstan should have a long loop length to protect against elimination of the loop in the event of immediate reversal, while a chamber supplying tape should have a short loop length. When these conditions are observed the storage afforded by the loops is employed to maximum benefit, improving reliability and efficiency because of the assurance of loop control and lessened demands on motor torque.

Figure 2:
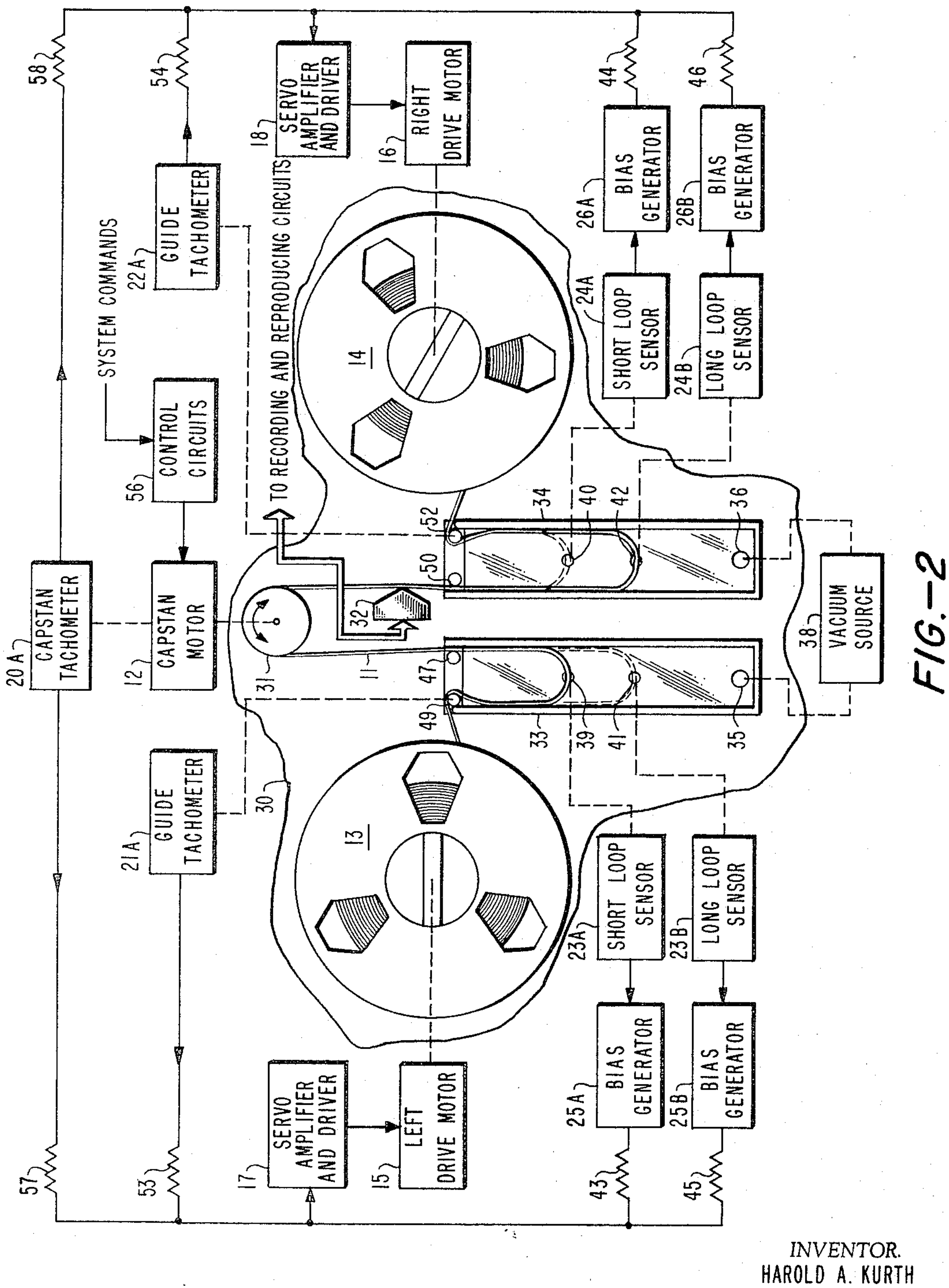
FIG. 2 is a combined block and diagrammatic representation showing the system of FIG. 1 in greater detail.

As seen in FIG. 2, the mechanical elements of an exemplary system are mounted on a panel 30, shown only in fragmentary form. The tape 11 may be moved in either direction along a controlled, predetermined path between the left and right reels 13 and 14 by means of a single drive capstan 31. The tape moves past a magnetic head assembly 32, which is located adjacent the capstan 31 and is coupled to recording and reproducing circuitry (not shown) in the usual fashion. The tape reels 13 and 14 are respectively driven by motors 15 and 16, which, in practice, would be mounted behind the panel 30 and directly connected to drive the tape reels.

Between the capstan 31 and the left and right reels 13 and 14, the tape path is defined by a pair of low inertia tape buffering devices, such as vacuum chambers 33 and 34, respectively. For optimum bidirectional operation, the tape reels 13 and 14 and the vacuum chambers 33 and 34 are symmetrically located with respect to the drive capstan 31.

The vacuum chambers 33 and 34 preferably have substantially equal, uniform cross-sections and are provided with vacuum inlet ports 35 and 36, respectively, which are connected to a vacuum source 38. The vacuum chambers 33 and 34 are also respectively provided with short loop position sensing ports 39 and 40 and with long loop position sensing ports 41 and 42. Each of the position sensing ports 39–42 may be connected to any one of a number of conventional differential pressure sensors 23A, 24A, 23B and 24B respectively, to detect changes in pressure at the ports caused by the presence or absence of the tape below the port. Thus, the sensors indicate the position of the tape loops within the vacuum chambers. It is apparent that other types of loop position sensor may be used, such as photoelectric or other conventional devices, and the invention is not limited to the use of any particular type of sensor.

The loop position sensors 23A, 24A, 23B, 24B, serve to provide switching signals to control bias generators 25A, 26A, 25B, 26B, respectively, which generate bias signals having one of two amplitudes depending on whether the tape loops are above or below the respective loop position sensing ports. These bias signals are provided through summing resistors 43, 44, 45 and 46 as one of the inputs to the servo amplifiers and drivers 17 and 18, with the signals from the bias generators 25A, 25B being supplied to the servo amplifier and driver 17 and the signals from the bias generators 26A, 26B being supplied to the servo amplifier and driver 18.

In order to guide the tape properly into and out of the vacuum chambers 33 and 34, each chamber is provided with roller guides at each side of the chamber. The chamber 33 has a low friction guide 47, such as an air guide, at its side adjacent the capstan 31 and a roller guide 49 at its side adjacent the tape reel 13. The roller guide 49 is mechanically connected to a guide tachometer 21A, which serves to indicate the speed of the tape into or out of the chamber 33. Similarly, the vacuum chamber 34 is provided with a low friction guide 50 and a roller guide 52, with the roller guide 52 being mechanically connected to drive the guide tachometer 22A. The tachometers 21A and 22A, along with the roller guides 49 and 52, respectively, correspond to the left and right tape velocity sensors 21 and 22 shown in FIG. 1. The signals from the guide tachometers 21A and 22A, which signals have amplitudes proportional to the speed of the tape passing over the roller guides 49 and 52, respectively, and polarities dependent on the direction of tape movement, are supplied through adding resistors 53 and 54, respectively, to the servo amplifiers and drivers 17 and 18, respectively.

In order to provide a high performance, high speed, bidirectional tape drive system, a single drive capstan 31 having a large wrap-around angle for the tape is utilized. Preferably, the capstan has a frictional surface which is slightly resilient, such as that provided by rubber. The capstan should be substantially undeformed, however, by the tape at the tensions provided by the vacuum chambers. It is apparent that various alternative arrangements may be utilized, such as a pneumatic or a vacuum capstan. Or a steel capstan might be used, along with idlers to hold the tape against it with light pressure. However, the slightly resilient rubber surface is preferred because it provides good starting, stopping and running friction as well as economical construction.

The capstan 31 is driven by a bidirectional motor 12, which is controlled by control circuitry 56 that converts commands from external sources (such as a data processor, not shown) to appropriate signals to energize the motor 12, controlling its speed and direction of rotation. The motor 12 should be of a type having a high torque-to-inertia ratio, such as those presently referred to as printed circuit motors.

From what has been thus far described of the system, certain inadequacies are apparent. While the tape may be driven at any desired speed by electronic control of the capstan 31, servos according to the prior art would not have adequate response or stability at all possible speeds. Thus, most systems tend to permit the loops to oscillate in length, to a greater or lesser degree dependent on speed. If a loop is momentarily short, a sudden mode reversal which draws tape from the chamber may cause loss of the loop. Conversely, the sudden supply of tape to an already long loop may cause the loop to pass the inlet. This problem is particularly acute during high speed search and high speed rewind modes of operation, in which elements are operating close to terminal velocities and in which control may suddenly be lost. It has not heretofore been economically feasible to reference the servos to actual tape speeds under all these desirable modes of operation.

Accordingly, by virtue of the present invention, the foregoing problems are obviated by providing a capstan tachometer 20A, which corresponds to the tape direction and speed sensor 20 shown in FIG. 1. The capstan tachometer 20A is driven directly by the capstan drive motor 12 and provides speed reference signals through resistors 57 and 58 to the servo amplifiers and drivers 17 and 18, respectively. These speed reference signals have amplitudes proportional to the speed of rotation of the drive capstan 31 and polarities dependent on the direction of rotation of the capstan. Thus, the speed reference signals are provided directly from the tape drive mechanism to the tape supply and takeup reel motors. When the capstan speed is changed, the speed reference signal from the tachometer 20A changes accordingly, and concurrently with the change of tape speed at the capstan. Not only is this speed reference signal a direct and accurate reference, but there is no time lag between reversal of tape direction of travel and provision of the signals. The provision of such a system constitutes a significant contribution to the art and solves most trying problems in maintaining positive loop control.

For purposes of explaining the operation of the system of the invention, and referring to FIG. 2, assume first that the tape 11 is being driven at high speed from the reel 13 acting as supply reel, around the drive capstan 31, and past the magnetic head assembly 32 to the reel 14, which is acting as take-up reel. In this mode of operation, the guide tachometer 21A driven by the roller guide 49 provides a negative feedback signal to be algebraically summed with the speed reference signal and the bias signal. The servo amplifier and driver 17 responds to any resulting error signal to cause the drive motor 15 to rotate the supply reel 13 in a counterclockwise direction at a speed either slightly above or below the tape speed at the capstan 31 depending upon the position of the loop relative to the sensing port 39. A short loop is needed in the chamber 33 and a long loop is needed in the chamber 34, to provide maximum tape loop storage within the chambers against the eventuality of a programmed reversal of tape direction at the capstan 31. Thus, when the loop in the chamber 33 is below the short loop sensing port 39, the bias generators 25A, 25B, provide no bias (or low amplitude) signals to be added to the speed reference signal. The tape speed at the reel is thus slightly below the tape speed at the capstan, which causes the loop length to shorten until the port 39 is reached. Thereafter the bias generator 25A provides a bias signal which is added to the speed reference and causes an instantaneous increase in the error signal to the servo amplifier and driver 17. The drive motor 15 is then accelerated until the tape speed at the reel is slightly above the tape speed at the capstan, thus causing the loop to lengthen and pass back across the sensing port 39. Similarly, in the chamber 34, the loop is expanded until the long loop sensor port 42 is reached, at which point the loop is held substantially constant.

Assume now that a command is received through the control circuits 56 to abruptly reverse the direction of tape travel, while the tape is still required to travel at high speed. With systems heretofore known, which do not utilize a capstan tape speed tachometer, such a situation presents a serious problem. Simultaneously, the tape loop in the vacuum chamber 33 lengthens, while the tape loop in the vacuum chamber 34 shortens. This is caused by the high speed operation of the capstan 31 relative to the drive motors 15 and 16. While it is true that many prior art systems do provide a signal indicating tape direction, they either operate with limit sensing controls, and merely attempt to hold the tape loop between limits, or they operate with complex analog sensors and circuitry.

In accordance with the invention, speed reference signals are provided to the servo amplifiers and drivers 17 and 18 from the capstan tachometer 20A which is driven directly by the capstan drive motor 12. Therefore, when the capstan drive motor reverses its direction of rotation in response to an external command, the polarity of the speed reference signal sent to the servo amplifiers and drivers is likewise reversed; as the capstan drive motor slows down and then picks up speed in the reverse direction of rotation, the reference signal for the servo automatically follows. Accordingly, an error signal for the servo is initially and immediately generated to produce torques which slow and accelerate the tape reels 13 and 14 to closely match speed changes of the capstan 31.

It is pointed out that the invention is particularly adapted for maximum utility in a transport system in which the tape is driven in either direction by a single drive capstan; this is true because signals for both the supply and take-up sides of the system are supplied by a single tachometer driven by the capstan drive motor. However, it is also within the contemplation of the invention that it is applicable to a two-capstan system, wherein one capstan drives the tape in one direction and the other capstan drives the tape in the reverse direction. A pinch roller cooperates with each capstan to force the tape into frictional engagement with that capstan. With the latter type of system, two capstan tachometers would be required, each drive capstan being provided with its own tachometer, the two tachometers providing control signals of opposite polarity and each tachometer providing signals to both sides of the system. Such an arrangement would retain the advantages of the system herein illustrated and described, so far as control of tape reel speed is concerned, but would be wasteful of components and would retain the prior art disadvantage of being extremely wearing on the tape.

Figure 3:
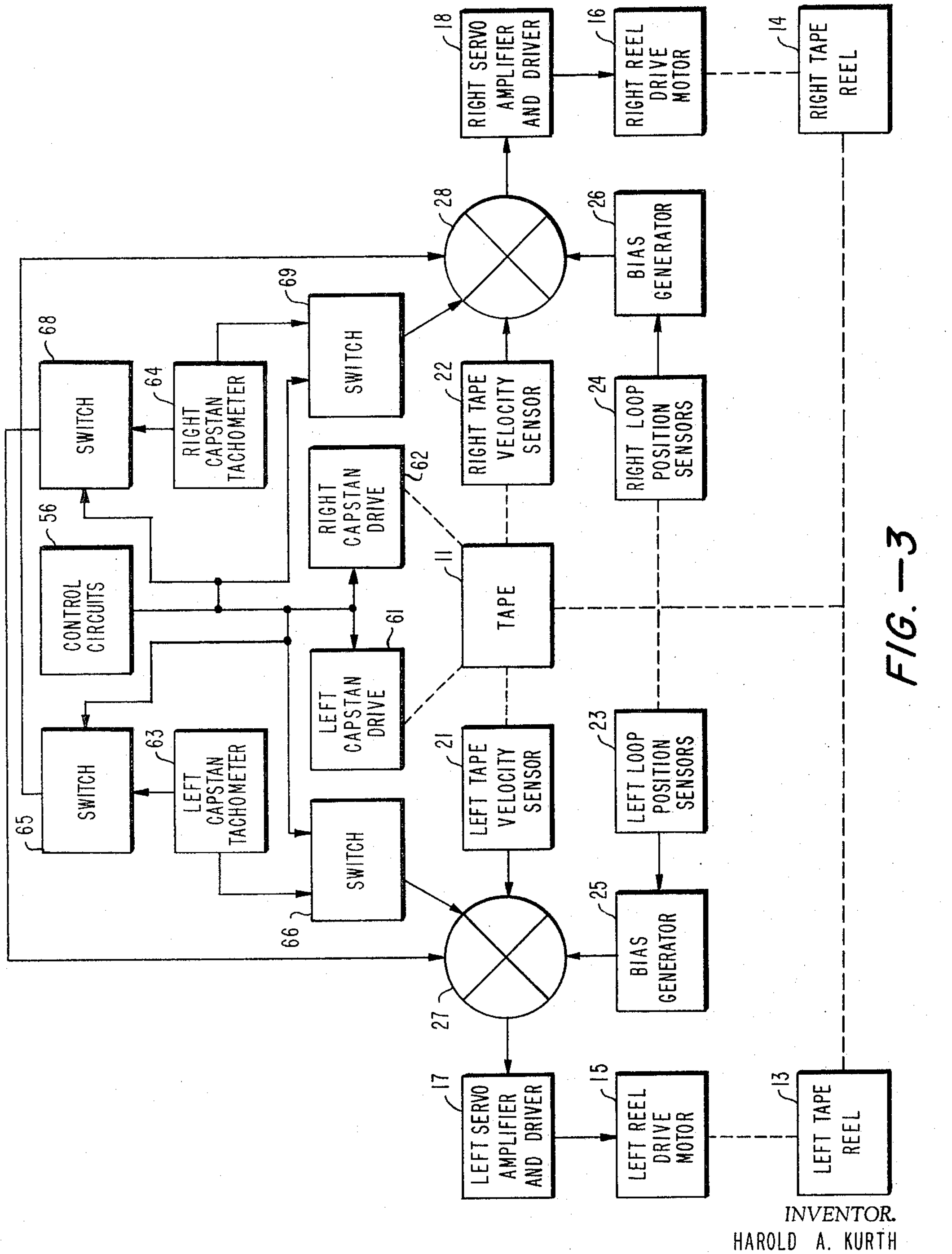
FIG. 3 is a block diagram of another embodiment of the invention.

An illustrative two-capstan system is shown in block diagram form in FIG. 3, wherein components common to the system shown in FIGS. 1 and 2 are designated by the same reference numerals. The system shown in FIG. 3 differs from that previously described in that two capstan drives 61 and 62 are provided, rather than one. It is understood that each capstan drive comprises a drive motor and a capstan, one combination serving to drive the tape in one direction and the other serving to drive the tape in the reverse direction. As previously mentioned, pinch rollers (not shown) are provided to engage and disengage the tape from the capstans under the control of circuitry 56 actuated by the data processor with which the tape system is associated.

Each of the left and right capstan drives 61 and 62 is connected to drive a tachometer, respectively designated as 63 and 64, which serves to provide signals to control the tape supply and take-up reels much in the manner previously described. The principal difference between the system shown in FIG. 3 and that shown in FIGS. 1 and 2 is that in the system of FIG. 3 the tape drive capstans (and pinch rollers) are individually actuated to drive the tape in forward and reverse directions. That is, if the tape is being driven in a forward direction, only one of the capstans engages the tape, whereas if the tape is being driven in the reverse direction, the other capstan engages the tape. Therefore, control signals must be provided to both tape reel motors from both capstan tachometers.

Inasmuch as the tape reel motors both rotate in the same direction for one to supply tape and the other to take up tape, for tape movement in either direction, signals of the same polarity must be supplied to the two drive motors. When the left capstan drive 61 is energized, its tachometer 63 supplies signals of one polarity to cause the left tape reel 13 to rotate in the proper direction and at the proper speed while it supplies signals of the same amplitude and polarity to the other side of the system to drive the tape reel 14. When the right capstan drive 62 is energized, signals are provided to the right side and to the left side of the system directly from the tachometer 64. Of course, those signals are of opposite polarity from those supplied by the tachometer 63 to cause the reels to rotate in the opposite direction. Because the capstans are continuously rotating, switches 65, 66 and 68, 69 coupled to the left and right capstan tachometers 63, 64 respectively, are operated by the control circuits 56 which govern the use of signals from the tachometers. Such a system is not preferred because of the simplicity of the single drive capstan system. Nevertheless, such a two-capstan system is within the contemplation of the invention.

As a further modification, a single tachometer might be utilized, with each capstan drive so coupled to it that when either capstan is actuated it rotates the tachometer in the appropriate direction to produce an output signal having appropriate polarity and amplitude. Or the single tachometer may simply be operated by a roller guide positioned in the tape path between the chambers.

Both of the described systems operate in essentially the same manner. If, as seen in FIG. 3, the tape reels 13 and 14 are serving as supply and take-up reels, respectively, the signals provided from the loop position sensors, the guide tachometers and the capstan tachometer are of such polarities as to cause both reels 13 and 14 to rotate in a like direction. For this direction, the appropriate tachometer 63 or 64 provides a speed reference signal for the tape velocity sensors 21, 22. The tape loops tend to change in opposite directions, however, so that one loop becomes short and the other long, for optimum use of the chamber lengths. The D.C. bias signals from the bias generators 25, 26 are used to maintain the loops oscillating about the selected loop sensing positions for that direction. Changes of speed and direction therefore have little effect on this system, which can shift between low speed and high speed modes with great freedom.

It is now apparent that the system of the invention provides an improved tape transport system, wherein more positive control over the tape is maintained than has heretofore been possible. It is also apparent that many changes and modifications may be made to the system without departing from the spirit and scope of the invention as expressed in the appended claims.

What is claimed is:

1. In a web transport system having low inertia web buffering means disposed in a path between a web storage reel and a single drive capstan, a servo system comprising: means for sensing the position of said web in said low inertia web buffering means and providing a position signal indicative thereof; tachometer means mechanically coupled to said capstan for providing a command signal representing the speed and direction of said capstan for all operating conditions thereof; means for sensing the speed and direction of said web on the side of said low inertia web buffering means opposite said capstan and providing a feedback signal indicative thereof; and means for algebraically adding said position signal, said command signal and said feedback signal to provide a speed signal to drive said web storage reel to maintain the web in oscillation about a desired position in said low inertia buffering means at a variety of driving speeds.

2. In a web transport system having low inertia buffering means disposed in a web path between a web storage reel and a single drive capstan for driving a web bidirectionally at varying speeds, a servo system comprising: means for sensing the position of said web in said low inertia buffering means and providing a position signal indicative thereof; a tachometer coupled to said capstan for providing a continuous drive signal indicative of the speed and direction of drive thereof; means for sensing the speed of said web on a side of said buffering means adjacent said storage reel and remote from said web capstan and providing a speed signal indicative thereof; and means for algebraically combining said position signal, drive signal and speed signal to provide a signal to drive said web storage reel to maintain the web in oscillation about a desired position in said low inertia buffering means during a variety of speeds and directions of drive of said web.

3. The servo system defined by claim 2, wherein said low inertia buffering means comprises a vacuum chamber and said means for sensing position comprises pressure sensitive switch means.

4. The servo system defined by claim 2, wherein said means for sensing the speed of said web on a side of said buffering means comprises a tachometer.

5. The servo system defined by claim 3, wherein said means for sensing the speed of said web on a side of said buffering means comprises a tachometer.

6. The servo system defined by claim 2, wherein said drive signal and said speed signal are bi-polar, the polarity of said signals being complementary and depending on the direction of drive of said web.

7. A tape transport system comprising: take-up and supply reels for said tape; a bidirectionally driven, variable speed capstan located intermediate said reels for driving said tape; a first tachometer mechanically coupled to said capstan for providing a bi-polar signal, the polarity of which represents the direction of tape travel and the amplitude of which represents the tape speed, second and third tachometers coupled to the tape adjacent the take-up and supply reels respectively to provide speed signals, and means responsive to the algebraic combination of said bi-polar signals and said speed signals for controlling the speed and direction of rotation of said reels in accordance with the speed and direction of rotation of said capstan.

8. In a tape transport servo system for driving a tape between two reels, said tape having looped portions associated with each reel, the combination including a single capstan for driving the tape bidirectionally at varying speeds, a tachometer mechanically coupled to the capstan for continuously providing a command signal indicative of the speed and direction of operation thereof, loop position sensing means associated with each of said looped portions for generating a predetermined position signal when the associated loop is on one side of said sensing means, means for providing speed signals representing the speed of the tape between the looped portions and the two reels, and means for algebraically combining the command signal with the speed and position signals from respective sides of the capstan to provide a pair of drive signals to drive the two reels.

9. In a web transport system having vacuum chambers respectively disposed in a web path between supply and take-up reels and a single drive capstan, said capstan being in constant non-sliding engagement with the web and driving the web bidirectionally at varying speeds, a servo system comprising: position sensing means disposed at two distinct locations within each vacuum chamber, each position sensing means including associated means for providing a position signal indicative of the location of the tape loop relative to the associated position sensing means, a first tachometer mechanically coupled to said capstan for providing a bi-polar command signal, the polarity of which represents the direction of drive of and the amplitude of which represents the speed of the capstan, a second tachometer coupled to the web at a side of one vacuum chamber opposite the capstan and adjacent the supply reel for providing a bi-polar speed signal, the polarity of which represents the direction of travel of and the amplitude of which represents the speed of the web, a third tachometer coupled to the web at a side of the other vacuum chamber opposite the capstan and adjacent the take-up reel for providing a bi-polar speed signal, the polarity of which represents the direction of travel of and the amplitude of which represents the speed of the web, means for algebraically combining said command signal, the speed signal from said second tachometer, and the position signals produced by the position sensing means within the vacuum chamber adjacent the supply reel for providing a first drive signal, means for algebraically combining said command signal, the speed signal from said third tachometer, and the position signals from the position sensing means within the vacuum chamber adjacent the take-up reel for providing a second drive signal, the polarity of said speed signals and said command signal being complementary and depending upon the direction of drive of said web, and means for driving the supply reel in accordance with said first drive signal and the take-up reel in accordance with said second drive signal.

References Cited by the Examiner

UNITED STATES PATENTS

| | | | |
|---|---|---|---|
| 2,777,964 | 1/1957 | Di Mino | 242—75.51 X |
| 2,921,753 | 1/1960 | Lahti et al. | 242—55.12 |
| 2,952,415 | 9/1960 | Gilson | 242—55.12 |
| 3,060,358 | 10/1962 | Peeples et al. | 242—75.51 X |
| 3,199,800 | 8/1965 | Reader | 242—55.12 |

OTHER REFERENCES

I.B.M. Technical Disclosure Bulletin, vol. 1, No. 5, February 1959, p. 24, "Tape Reel Drive Control," R. J. Kochenburger.

FRANK J. COHEN, *Primary Examiner.*

GEORGE F. MAUTZ, *Examiner.*